United States Patent
Longwell et al.

(10) Patent No.: US 7,585,009 B2
(45) Date of Patent: Sep. 8, 2009

(54) SIDE CURTAIN AIR BAG DEPLOYMENT PILLAR BRACKET AND GARNISH

(75) Inventors: Justin Longwell, Westerville, OH (US); Scott Mudlin, Raleigh, NC (US); Grant Foreman, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 11/558,484

(22) Filed: Nov. 10, 2006

(65) Prior Publication Data

US 2008/0111395 A1 May 15, 2008

(51) Int. Cl.
*B60J 9/00* (2006.01)
(52) U.S. Cl. ............... 296/1.02; 296/193.06; 16/110.1; 16/DIG. 40
(58) Field of Classification Search ........... 296/193.06, 296/1.02; 16/110.1, DIG. 40, DIG. 41
See application file for complete search history.

(56) References Cited

U.S. PATENT DOCUMENTS 6,254,123 B1 7/2001 Urushi et al.
6,293,581 B1 9/2001 Saita et al.
2003/0230878 A1 12/2003 Inoue
2004/0108694 A1* 6/2004 Takahashi ............... 280/730.2
2004/0160078 A1* 8/2004 Hwang ..................... 296/39.1

FOREIGN PATENT DOCUMENTS

JP 2000257321 3/2002

* cited by examiner

*Primary Examiner*—Lori L Lyjak
(74) *Attorney, Agent, or Firm*—Rankin, Hill & Clark LLP; Mark E. Duell

(57) ABSTRACT

A bracket for placement between the A-pillar and pillar garnish in an automobile, wherein the bracket includes a base and first and second mounting flanges for use in attaching the bracket to the A-pillar structure. The bracket also includes first and second handle flanges for use in attaching an occupant grab handle to the bracket. The bracket also includes a garnish mounting flange located between the base and handle flange. The garnish is secured to the bracket allowing the garnish to deflect slightly inwards and outwards, but not to such an extent that damage to the garnish occurs.

9 Claims, 5 Drawing Sheets

SIDE CURTAIN AIR BAG DEPLOYMENT PILLAR BRACKET AND GARNISH

BACKGROUND OF THE INVENTION

1. Field of the Invention

This invention relates to brackets, more particularly to brackets used between an A-pillar and an associated pillar garnish on an automobile.

2. Description of Related Art

The most advanced modern vehicles are designed to meet industry requirements for minimizing injury to passenger's heads during an event such as an accident. Specifically, numerous target points on the vehicle's interior are tested using a passenger head simulator which impacts the target points during a simulated crash. Typical target points are on the vehicle roof, side rail, header and pillars. Materials such as garnishes that cover the structural member(s) of a pillar, etc. are designed to absorb a certain amount of force of the moving head simulator and, thus, cushion an impact.

In addition to garnish design, air bags play a significant role in protecting vehicle occupants during accidents. In a vehicle, a front pillar (commonly referred to as the "A-pillar") may include an air bag that is placed between a pillar structural member and a protective/decorative cover garnish. When the air bag is deployed, the garnish is deflected slightly, thus, allowing the expanding air bag to enter the passenger compartment.

In addition to meeting head impact requirements, a pillar system that includes an air bag and garnish should also prevent damage to the garnish when the air bag is deployed or the garnish impacted (damage is most likely to occur when the temperature in the vehicle is low and the garnish less flexible), allow the air bag to be deployed quickly, and minimize space usage because an A-pillar is located within a driver and passenger's line of sight. Additionally, the pillar system should provide a suitable structure for mounting a grab handle that provides convenience for the vehicle passenger's entry and exit.

Some known pillar systems provide a bracket between the pillar structure and garnish to meet head impact requirements. What is desired is an improved bracket that, in addition to meeting head impact requirements, also minimizes visual obstruction, provides a mount for a grab handle and supports the garnish such that potential damage to the garnish is minimized both during deployment of an air bag (when the garnish moves outward) and during an impact event (when the garnish is contacted and moves inwards). Such a bracket is particularly required when a common vinyl-type garnish is used as opposed to a garnish that includes an outer fabric cushion.

BRIEF SUMMARY OF THE INVENTION

The present invention provides an improvement over the prior art by providing an improved pillar bracket that that is used in combination with a side curtain air bag on the A-pillar of an automobile. The bracket may be used on either the driver's side A-pillar, passenger side A-pillar, or both. The structure of the pillar bracket provides the strength required to be a suitable mount for a grab handle, if desired. Additionally, the structure of the pillar bracket and the ability of the bracket to attach to the garnish provides support for the garnish so the garnish meets head impact requirements, but is not damaged during air bag deployment. The structure of the bracket further allows the pillar system to be designed compactly so as not to be a significant visual obstruction.

The bracket includes a base and first and second mounting flanges for use in attaching the bracket to the A-pillar structure. The bracket also includes first and second handle flanges for use in attaching an occupant grab handle to the bracket. The bracket also includes a garnish mounting flange located between the base and handle flange. The garnish is secured to the bracket allowing the garnish to deflect slightly inwards and outwards, but not to such an extent that damage to the garnish occurs.

These and other aspects of the invention are herein described in particularized detail with reference to the accompanying figures.

DETAILED DESCRIPTION OF THE INVENTION

Figure 3:
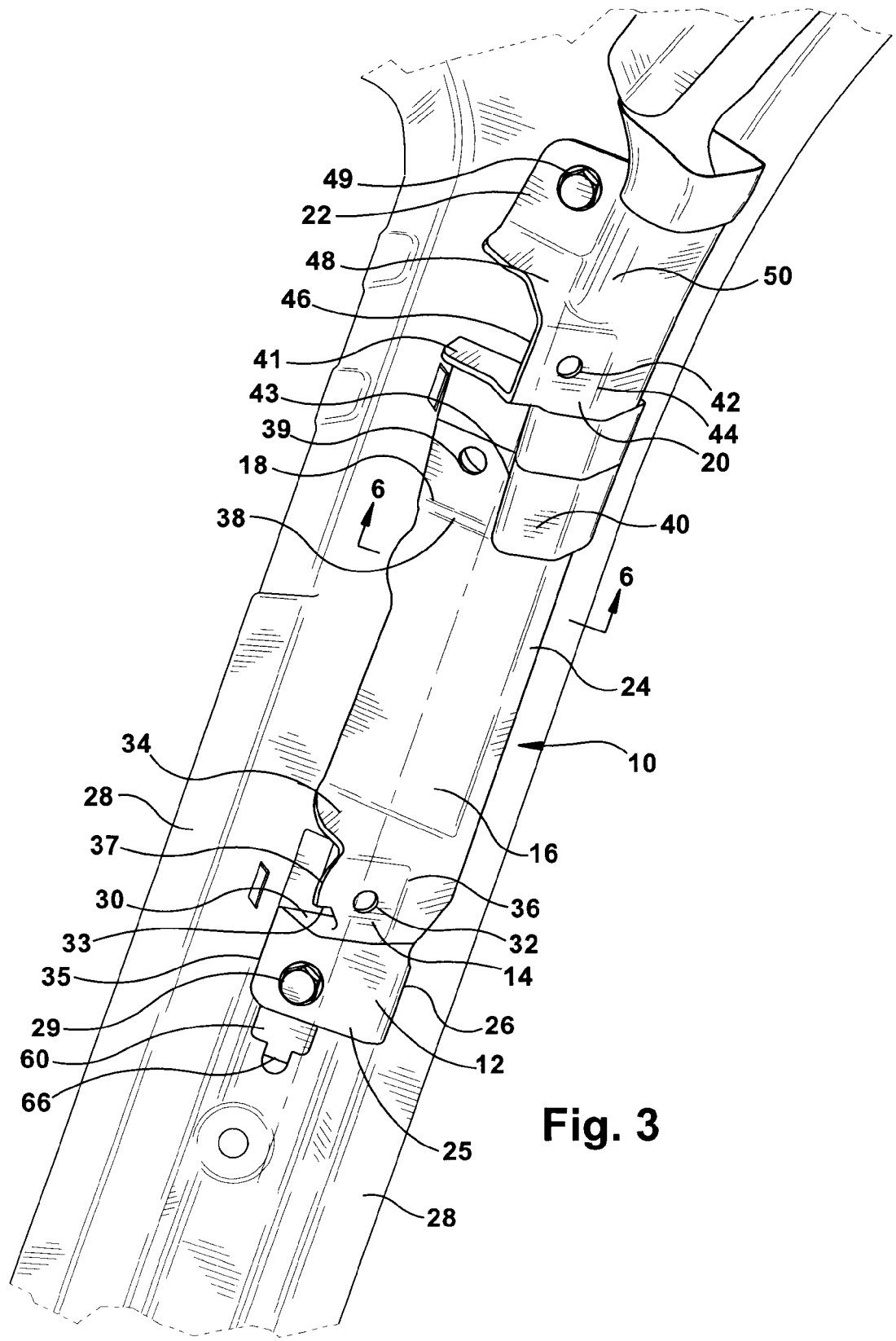
FIG. 3 is a perspective view of the bracket attached to the vehicle A-pillar.
Figure 4:
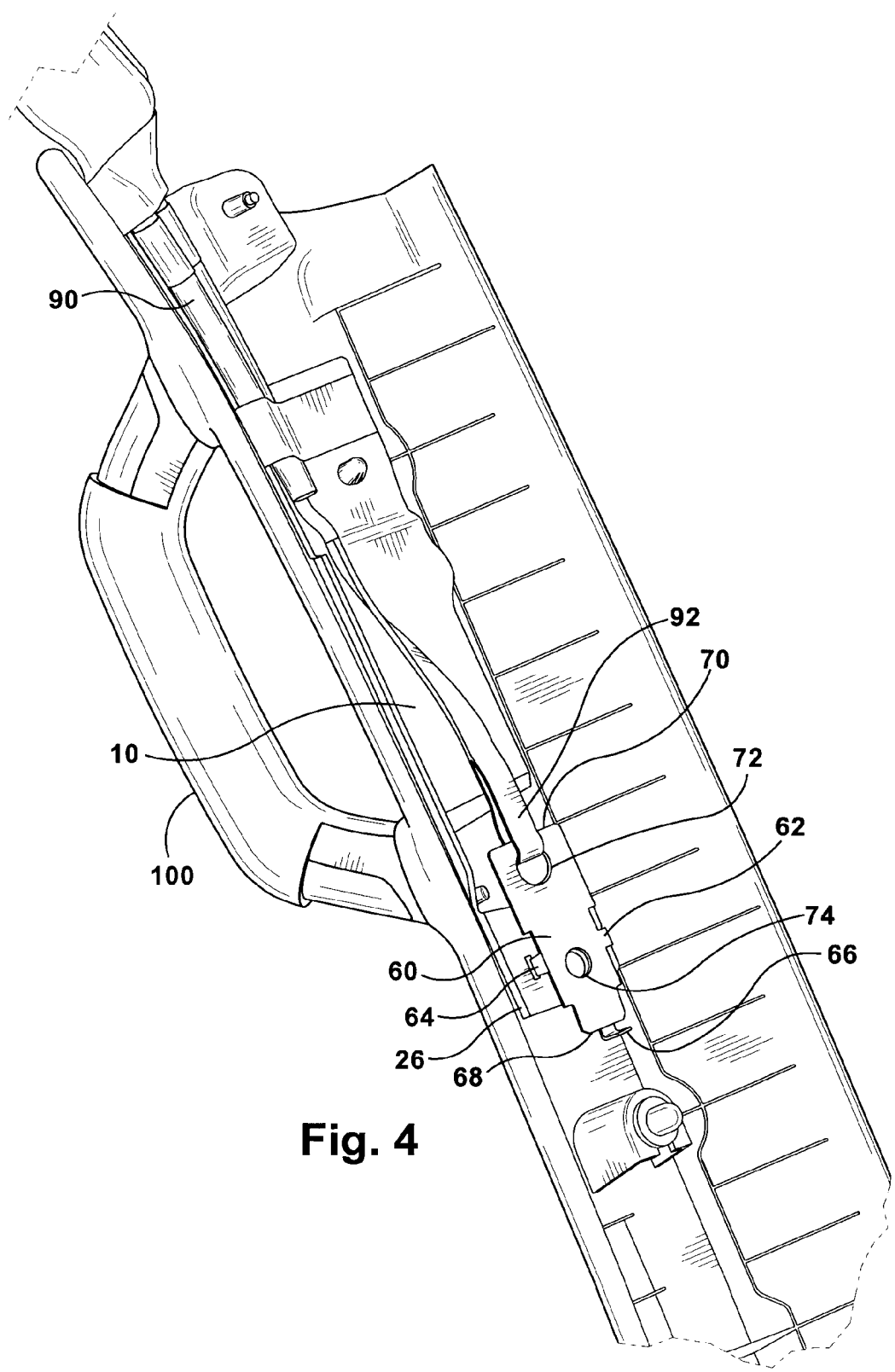
FIG. 4 is a rear view of the bracket handle and garnish without showing the A-pillar.

Referring to the drawings, specifically FIGS. 3-4, a preferred pillar bracket 10 according to the present invention is illustrated. The bracket 10 is generally rectangular with sections along its length that are elevated with respect to a base section. The elevated sections include portions that are tilted with respect to the plane of the base. As described in more detail below, the bracket 10 includes as follows, from the bottom to the top of the bracket 10 (with respect to the vehicle when the bracket is mounted to the vehicle A-pillar): a first mounting flange 12, a first handle flange 14, a base 16, a garnish flange 18, a second handle flange 20 and a second mounting flange 22, as well as various intervening walls. A sidewall 24 extends from approximately the first handle flange 14 to the second mounting flange 22. Preferably, the bracket 10 is manufactured as a single piece from mild steel, via a stamping process.

Beginning at the bottom end 25 of the bracket 10, the first mounting flange 12 is provided and is generally square, oriented in the same plane as the base 16, and extends across the width of the bracket 10. The first mounting flange 12 includes narrow flaps 26 on each edge along the width of the bracket 10, which extend toward the pillar structure 28 when the bracket 10 is mounted in place on the vehicle. The first mounting flange 12 defines an aperture 29 at its center for the passage of a mounting bolt that attaches the bracket 10 to the pillar structure 28.

Moving up the bracket 10, the first handle flange 14 is located adjacent to the first mounting flange 12. The first handle flange 14 is elevated with respect to the first mounting flange 12 and the base 16. Because the first handle flange 14 is elevated, a first transition wall 30 is provided between the first mounting flange 12 and the first handle flange 14. The first transition wall 30 is perpendicular to the plane defined by the first mounting flange 12. The first handle flange 14 is generally planer and defines a mounting aperture 32 in its center through which a bolt from the handle 100 passes. A notch section 33 is contoured to match a similar contour on a grab handle to guarantee that the handle is mounted with the correct orientation. A second transition wall 34 is located between the first handle flange 14 and the base 16. The second transition wall 34 is perpendicular to the plane of the base 16. A portion of the sidewall 24 horizontally aligned with the first handle flange 14 extends vertically from a height below the plane of the base 16 to the height of the first handle flange 14. The first handle flange 14 is tilted such that a first edge 36 of the first handle flange 14, intersects the sidewall 24, and is lower than an opposite edge 37. This opposite edge 37 is located closer to the lengthwise centerline of the bracket 10 than a corresponding edge 35 of the first mounting flange 12.

The base 16 is located adjacent to the first handle flange 14, specifically intersecting the second transition wall 34, and has a generally rectangular shape. A portion of the sidewall 24 horizontally coincides with the full length of the base 16 and extends from the plane of the base 16 toward the pillar structure 28.

The garnish mounting flange 18 is located on the opposite side of the base 16 from the first handle flange 14. The garnish mounting flange 18 is also raised above the level of the base 16. A third transition wall 38 is located between the base 16 and the garnish mounting flange 18. The third transition wall 38 is perpendicular to the plane of the base 16. The garnish mounting flange 18 is generally rectangular, generally parallel to the plane of the base 16, and an aperture 39 is defined near the center of the garnish mounting flange 18. The bracket sidewall 24 includes a portion horizontally aligned with the garnish mounting flange 18 that extends upward from below the plane of the base 16 to the level slightly above the garnish mounting flange 18. A transverse junction section 40 extends from the top of this sidewall portion to a first edge directly above the garnish mounting flange 18 and tilts slightly, with an edge that intersects the sidewall 24 of the bracket 10, being lower than the first edge. A fourth transition wall 43 extends from the first edge of the transverse junction section 40 to the garnish mounting flange. The transition wall 43 is generally perpendicular to the third transition wall 38 and generally perpendicular to the plane of the garnish mounting flange 18. A fifth transition wall 41 is located between the garnish mounting flange 18 and the second handle flange 20. The fourth transition wall 41 is also perpendicular to the plane of the base 16.

The second handle flange 20 is located on the opposite side of the garnish mounting flange 18 from the base 16. The second handle flange 20 is raised above the plane of the base 16. The second handle flange 20 is generally planer and defines a mounting aperture 42 in its center through which a bolt from the handle 100 passes. A portion of the sidewall 24 horizontally aligned with the second handle flange 20 extends vertically from the height below the plane of the base 16 to the height of the second handle flange 20. The second handle flange 20 is tilted such that an edge 44 of the second handle flange 20, adjacent the sidewall 24, is lower than an opposite edge 46.

A sixth transition wall 48 is located between the second handle flange 20 and the second mounting flange 22. The second mounting flange 22 is generally square and oriented in the same plane as the base 16. The second mounting flange 22 does not extend across the full width of the bracket 10. The second mounting flange 22 defines an aperture 49 at its center for the passage of a mounting bolt.

A portion of the sidewall 24 adjacent to the second mounting flange 22 extends upward from a level below the base 16 and merges into a cover section 50 that is generally cylindrically arched and is approximately equal in width to the second mounting flange 22.

Figure 1:
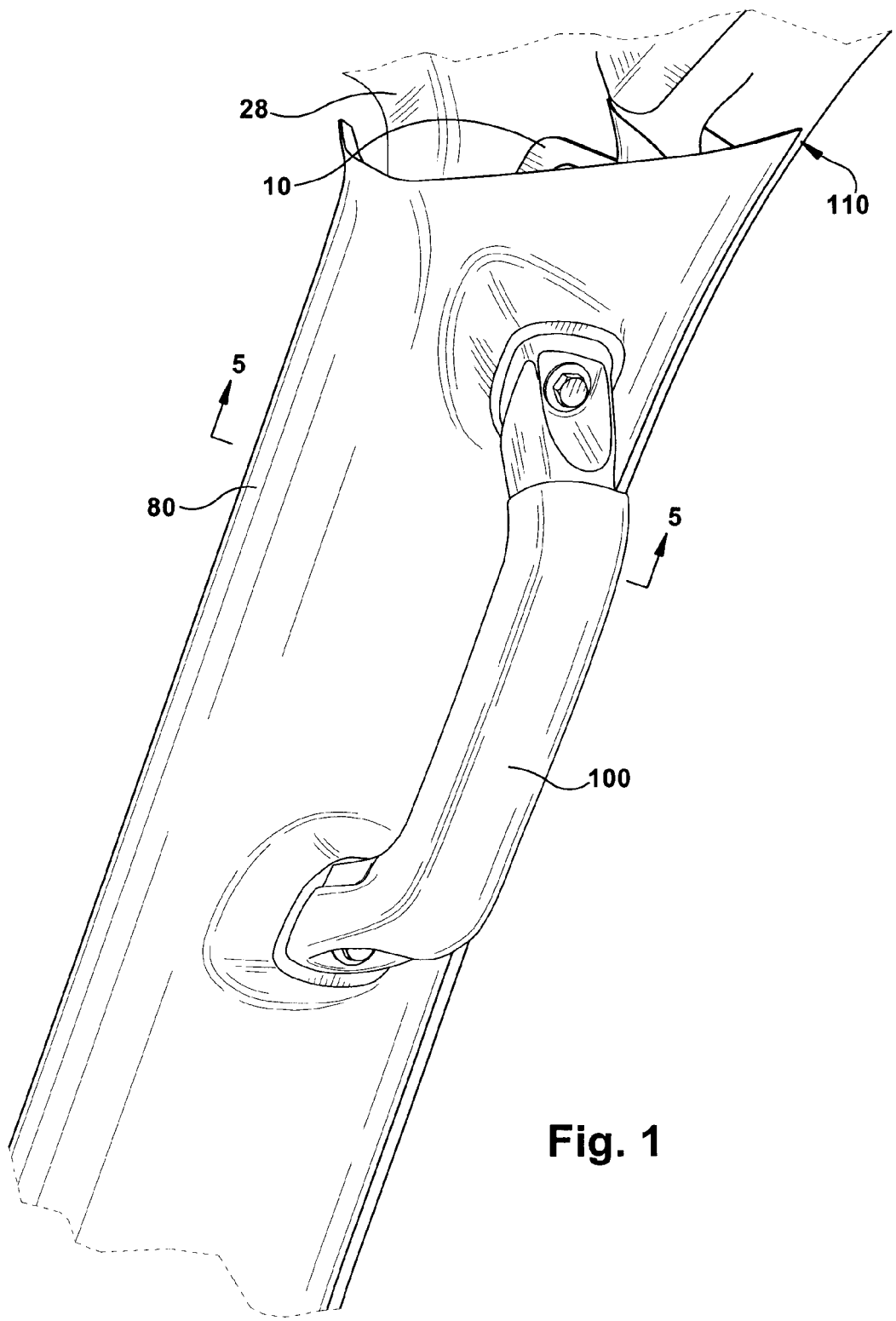
FIG. 1 is a perspective view of the bracket garnish and handle of the present invention, attached to a vehicle A-pillar.
Figure 6:
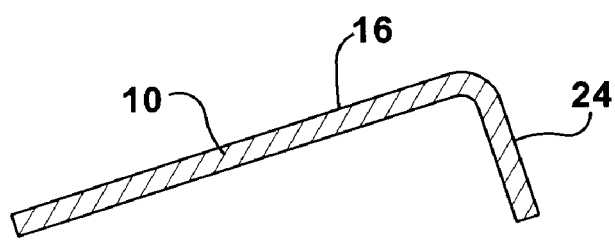
FIG. 6 is a cross sectional view of the bracket.

Referring to FIGS. 1, 3 and 6, the sidewall 24 has been previously described above in sections, but as a whole is generally perpendicular to the base 16 and extends away from the plane of the base 16 toward the pillar structure 28 at a generally equal distance along the length of the sidewall 24, except in the vicinity of the first mounting flange where the sidewall 24 is replaced by the flaps 26 previously described.

When the bracket 10 is installed upon the pillar structure 28, the first mounting flange 12 and second mounting flange 22 abut against pillar structure 28. The bracket 10 as a whole has a slight curve that follows a contour that is present in the garnish 80.

Figure 2:
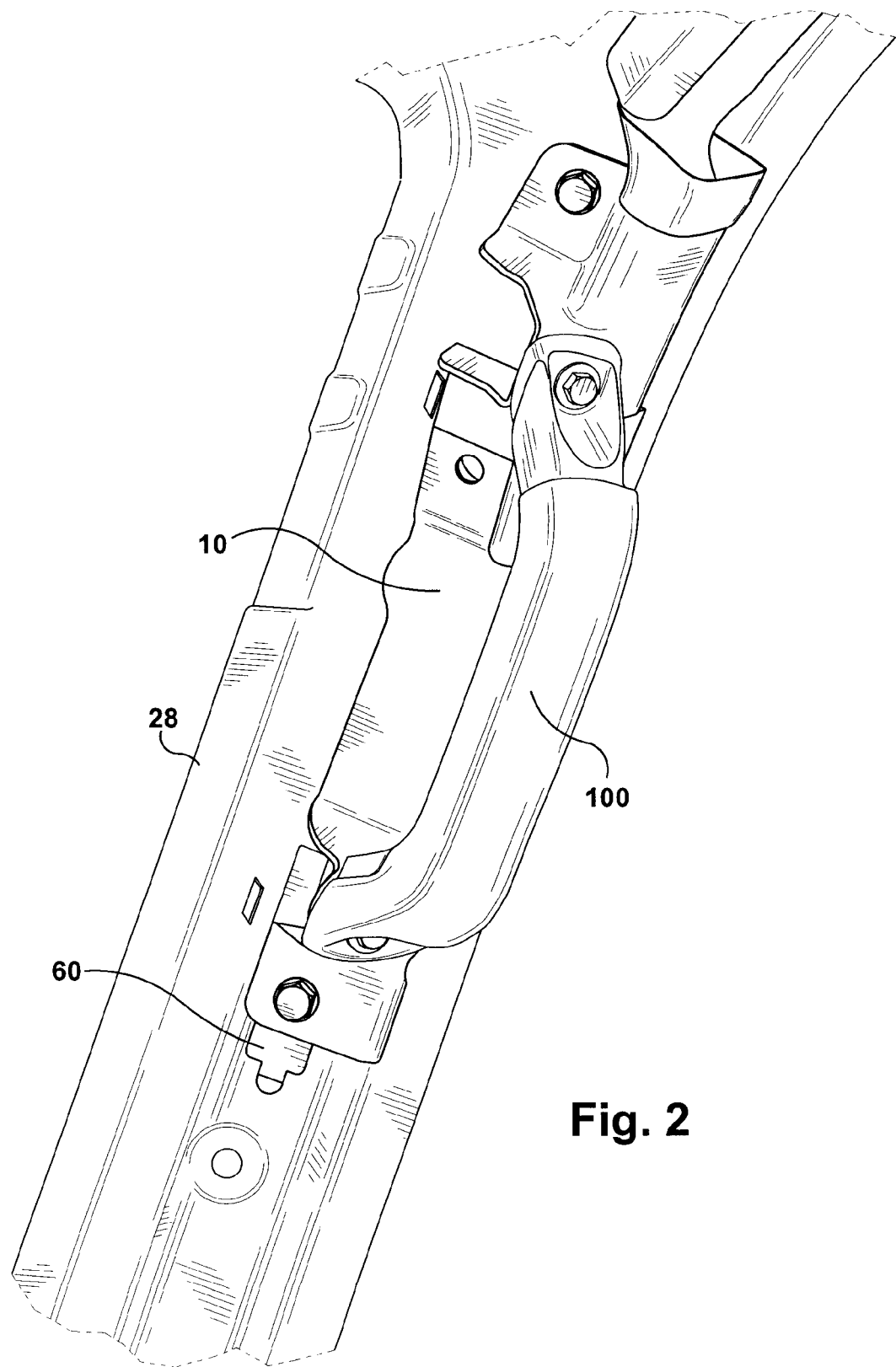
FIG. 2 is a perspective view of the bracket and handle only, attached to the vehicle A-pillar.

Referring to FIGS. 2 and 4, an adapter plate 60 that is formed separately from the bracket 10 and includes first and second clasps 62 and 64 and a tang 66 is shown. The adapter plate 60 is generally rectangular and the tang 66 is at a first end 68 of the plate 60. The tang 66 is bent toward the pillar structure 28. At the opposite end 70 of the adapter plate 60, an aperture 72 is defined. A central aperture 74 is also defined in the adapter plate 60. The first and second clasps 62 and 64 are located at approximately the mid point of the length of the adapter plate 60 and are on opposite sides of the adapter plate 60, extending outwardly therefrom. The clasps 62 and 64 can be folded over without breaking. The adapter plate 60 fits between the first mounting flange 12 of the bracket 10 and the pillar structure 28.

Figure 5:
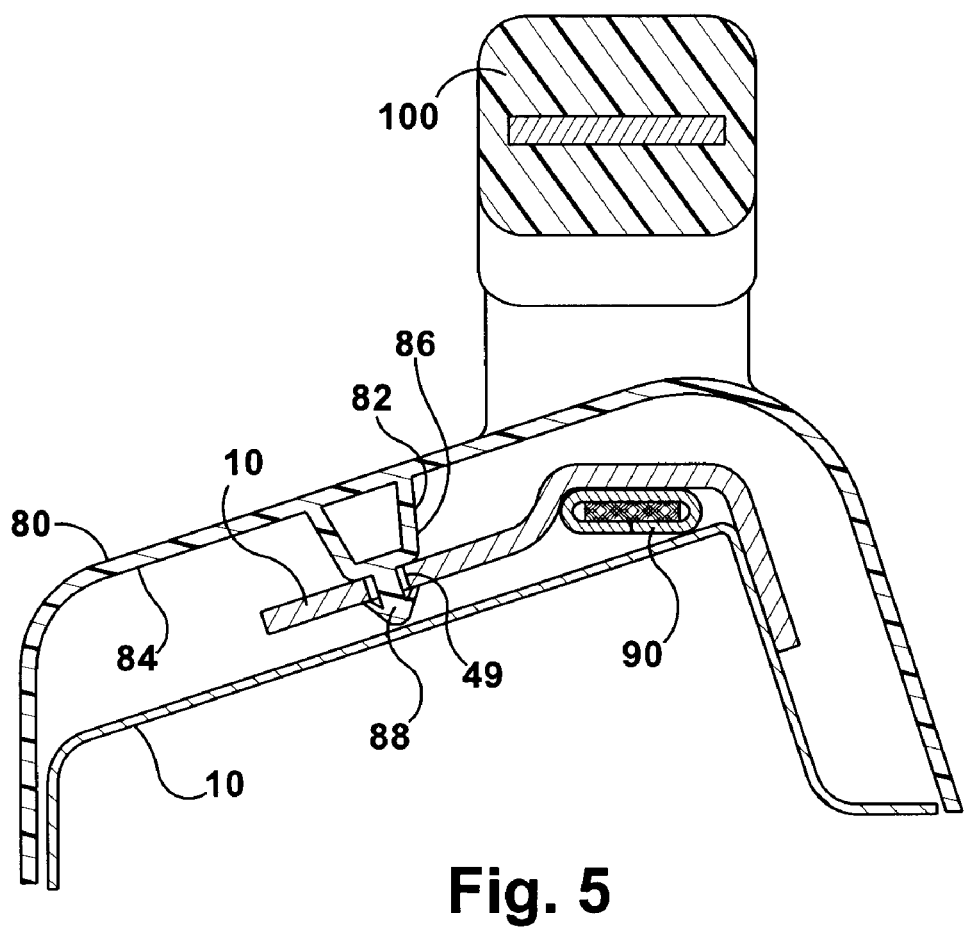
FIG. 5 is cross sectional view of the bracket, A-pillar, air bag, handle and garnish.

Referring to FIGS. 3 and 4, a typical vehicle A-pillar 28 is shown with a bracket 10 of the present invention attached thereto. Additionally, a side curtain air bag (SCAB) 90 is shown between the bracket 10 and the A-pillar structure 28. Referring to FIG. 5, a cut-away section of garnish 80 is shown covering the bracket 10.

Referring to FIGS. 1-4, assembly of the bracket 10, garnish 80, air bag 90 and A-pillar structure 28 is shown. First, the adapter plate 60 of the bracket 10 is placed on the A-pillar structure 28. The tang 66 fits into an aperture of the A-pillar structure 28. The air bag 90 and bracket 10 are then placed as an assembly on the A-Pillar structure 28 and fastened thereto. The air bag 90 and bracket 10 are installed simultaneously as part of a module. A cord portion 92 of the air bag 90 fits within the aperture 72 in the adapter plate 60 and is held therein. The bracket 10, in place over the air bag 90, is then bolted to the A-pillar structure 28. The clasps 62 and 64 on the adapter plate 60 fit into or around slots on the first mounting flange 12 and are folded over in order to secure the adapter plate 60 to the bracket 10. The cover section 50 covers a portion of the air bag 92 that extends out from the bracket 10 and toward the top of the vehicle. A bolt passing through the first mounting flange 12 of the bracket 10 also passes through the central aperture 74 in the adapter plate 20.

The garnish 80 is placed over the bracket 10 and the remainder of the A-pillar 28. Referring to FIG. 5, a clip 82 protruding from the back side 84 of the garnish 80 fits into the aperture 49 within the garnish mounting flange 18. The clip 82 includes a spacer 86 and a nipple 88. The nipple 88 passes through the aperture 49 and snappingly engages the garnish mounting flange 18. The garnish 80 can be detached from the bracket 10 without breaking the clip 82. The handle 100 is then attached to the bracket handle flanges 14 and 20 by extending bolts through the garnish 80. Preferably, the handle is only installed on the passenger side of the vehicle.

Referring to FIGS. 1, 3 and 5, when the vehicle is involved in a collision, the air bag 90 inflates and extends through a gap 110 between the A-pillar structure 28 and the bracket 10 and garnish 80 combination.

Because the bracket 10 is placed between the garnish 80 and air bag 90, when the air bag 90 inflates and expands, the garnish 80 is not deflected as much as if the bracket 10 were not present. Thus, the risk of damage to the garnish 80 during outward expansion is reduced. The shape of the bracket 10 acts as a housing that keeps the air bag 90 in position before it is deployed and protects the air bag 90 from damage. The shape of the first handle flange 14 and the second handle flange 20 of the bracket 10 provide the rigidity in the bracket required such that the handle does not need to be mounted to the pillar structure 28 directly. Additionally, the shape of the handle mounting flanges 14 and 20 provides significant column strength and provides a large strength to deflection ratio.

Because the garnish 80 is clipped directly to the bracket 10, the garnish 80 is able to meet head impact requirements and not deflect significantly during inward expansion. The spacing of the bracket 10 from the garnish 80 caused by the spacer portion 86 of the clip 82 allows for slight, but not significant deflection upon impact.

Because the bracket 10 is formed from steel, a high level of strength is provided using a relatively small bracket 10. As a result, the garnish 80 that covers the bracket 10 and A-pillar 28 fits closely to the A-pillar 28 and minimizes visual obstruction.

The bracket is a significant improvement over the prior art because the garnish is not damaged due to significant deflection when the air bag is deployed or garnish impacted. However, the bracket does not slow down the speed of air bag deployment significantly.

Also, the bracket acts as a mount for a grab handle, the handle not having to be attached directly to the pillar. The bracket further provides an attachment point for the vehicle garnish that is close to the surface of the garnish, thus the garnish deflects less when the vehicle occupant impacts the garnish. This is especially important in multiple rollover instances of the vehicle where there remains the potential for the vehicle occupant to contact the A-pillar after the air bag has already deployed.

Preferably, the garnish is a simple vinyl type and does not include a fabric applied to its outer surface, but alternatively may be other types of known garnishes. The bracket may also include fold and/or bead reinforcement in desired positions to provide additional strength. Bolted connections may be replaced by other fasteners such as clips.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A bracket for use in a vehicle A-pillar system that includes an A-pillar structure, a side curtain air bag, occupant grab handle, and garnish, the bracket comprising:
   a base;
   first and second mounting flanges each defining an aperture for use in attaching the bracket to the A-pillar structure;
   first and second handle flanges, each defining an aperture for use in attaching the grab handle to the bracket; and
   a garnish mounting flange, wherein the garnish is clippable to said garnish mounting flange.

2. The bracket of claim 1, wherein the bracket is manufactured from mild steel.

3. The bracket of claim 1, wherein the bracket further includes an adapter plate mechanically attached to the first mounting flange, wherein the adapter plate defines an aperture to facilitate attachment to the air bag.

4. The bracket of claim 1, wherein the garnish mounting flange is located between the base and second handle flange to provide a preferred mounting position for the garnish.

5. The bracket of claim 1 further including a sidewall extending from at least the base toward the A-pillar structure when the bracket is mounted on the A-pillar.

6. The bracket of claim 1, wherein the first and second mounting flanges are located at the proximal and distal ends of the bracket respectively and the first handle flange and garnish flange flank the base.

7. An automobile pillar system comprising:
   an A-pillar structure;
   a bracket mechanically attached to the A-pillar and including:
      a base;
      first and second mounting flanges each defining an aperture for use in attaching the bracket to the pillar structure;
      first and second handle flanges, each defining an aperture for use in attaching the grab handle to the bracket; and
      a garnish mounting flange, wherein a garnish is clippable to said garnish mounting flange.
   a side curtain air bag secured between the A-pillar and bracket; and
   a garnish clipped to and covering the bracket.

8. The automobile pillar system of claim 7 wherein the garnish includes a clip having a spacer portion that spaces the garnish from the bracket and a nipple portion that clips the garnish to the bracket.

9. A bracket for use in a vehicle A-pillar system that includes an A-pillar structure, a side curtain air bag, and garnish, the bracket comprising:
   a base;
   first and second mounting flanges each defining an aperture for use in attaching the bracket to the A-pillar structure; and
   a garnish mounting flange, wherein the garnish is clippable to said garnish mounting flange.

* * * * *